US010038547B2

(12) United States Patent
Lecourtier

(10) Patent No.: US 10,038,547 B2
(45) Date of Patent: Jul. 31, 2018

(54) METHOD FOR SYNCHRONISING A SERVER CLUSTER AND SERVER CLUSTER IMPLEMENTING SAID METHOD

(75) Inventor: Georges Lecourtier, Versailles (FR)

(73) Assignee: BULL SAS, Les Clayes-Sous-Bois (FR)

( * ) Notice: Subject to any disclaimer, the term of this patent is extended or adjusted under 35 U.S.C. 154(b) by 168 days.

(21) Appl. No.: 14/241,059

(22) PCT Filed: Aug. 28, 2012

(86) PCT No.: PCT/FR2012/051945
§ 371 (c)(1),
(2), (4) Date: Feb. 25, 2014

(87) PCT Pub. No.: WO2013/030504
PCT Pub. Date: Mar. 7, 2013

(65) Prior Publication Data
US 2014/0207971 A1     Jul. 24, 2014

(30) Foreign Application Priority Data
Aug. 30, 2011   (FR) ..................... 11 57642

(51) Int. Cl.
*H04L 7/00* (2006.01)
*G06F 1/12* (2006.01)
(Continued)

(52) U.S. Cl.
CPC ............. *H04L 7/0079* (2013.01); *G06F 1/10* (2013.01); *G06F 1/12* (2013.01); *H04J 3/0638* (2013.01); *H04L 7/0008* (2013.01); *H04L 7/0337* (2013.01)

(58) Field of Classification Search
CPC ... H04L 7/0079; H04L 7/0008; H04L 7/0337; G06F 1/12; G06F 1/10; H04J 3/0638
See application file for complete search history.

(56) References Cited

U.S. PATENT DOCUMENTS 4,807,259 A * 2/1989 Yamanaka et al. ........... 375/358
5,361,277 A * 11/1994 Grover ........................ 375/356
(Continued)

OTHER PUBLICATIONS

Mills, David L. "Internet time synchronization: the network time protocol." Communications, IEEE Transactions on 39.10 (1991): 1482-1493.*

(Continued)

*Primary Examiner* — Scott B Christensen
*Assistant Examiner* — Lam Do
(74) *Attorney, Agent, or Firm* — Pillsbury Winthrop Shaw Pittman LLP

(57) ABSTRACT

A method and system for synchronizing a server cluster having a plurality of nodes each provided with an internal clock and interconnected with each other by a clock interconnection network comprising a plurality of transmission segments. Time-stamping information is generated by the internal clock of a source chosen from the nodes of the server cluster. The time-stamping information is transmitted to all the nodes in the server cluster from the source; and and the internal clock of each node of the server cluster is adjusted from this time-stamping information The time for transmission of the time-stamping information is adjusted by each transmission segment to a constant value established for each transmission segment. Upon receiving the time-stamping information by any one of the nodes in the server cluster, its internal clock is adjusted from the time-stamping information and information relating to the transmission segments passed through between the source and this node.

19 Claims, 4 Drawing Sheets

Figure 1:
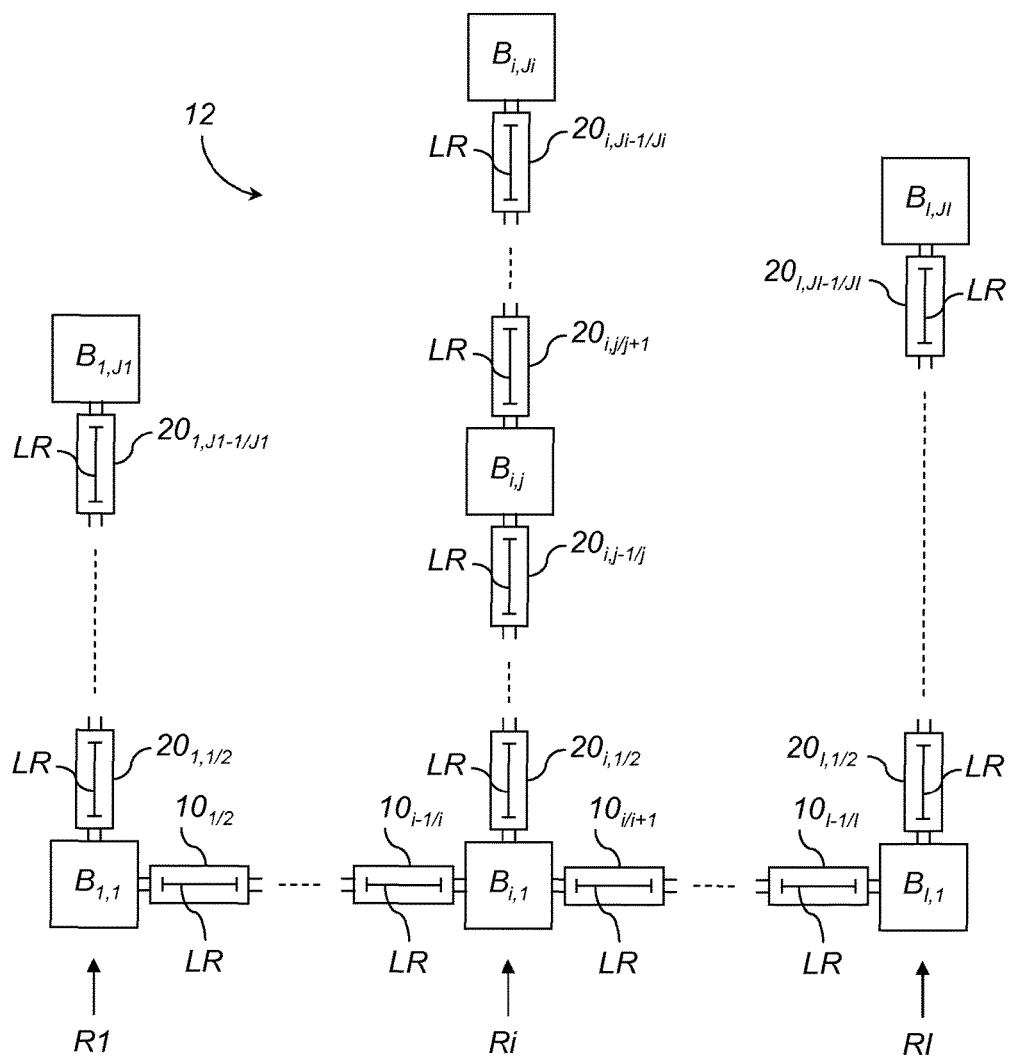

(51) Int. Cl.
*G06F 1/10* (2006.01)
*H04J 3/06* (2006.01)
*H04L 7/033* (2006.01)

(56) References Cited

U.S. PATENT DOCUMENTS

| | | | |
|---|---|---|---|
| 5,550,875 A | 8/1996 | Bennett | |
| 5,610,953 A * | 3/1997 | Betts et al. | 375/373 |
| 5,958,060 A * | 9/1999 | Premerlani | 713/400 |
| 6,629,250 B2 * | 9/2003 | Kopser | H04L 7/0012 |
| | | | 713/401 |
| 6,696,875 B1 | 2/2004 | Arkas et al. | |
| 7,818,457 B1 * | 10/2010 | Flood et al. | 709/248 |
| 7,849,348 B1 * | 12/2010 | Sidiropoulos | G06F 1/10 |
| | | | 327/146 |
| 8,520,646 B1 * | 8/2013 | Dinan | H04W 84/12 |
| | | | 370/315 |
| 2002/0167857 A1 | 11/2002 | Magoshi | |
| 2003/0039250 A1 * | 2/2003 | Nichols et al. | 370/394 |
| 2003/0061356 A1 * | 3/2003 | Jason, Jr. | 709/227 |
| 2003/0219082 A1 * | 11/2003 | Tanaka et al. | 375/324 |
| 2005/0046458 A1 * | 3/2005 | Schroeder | G06F 1/10 |
| | | | 327/276 |
| 2005/0168945 A1 * | 8/2005 | Coglitore | 361/695 |
| 2005/0200393 A1 * | 9/2005 | Furtner | G06F 1/08 |
| | | | 327/291 |
| 2005/0220235 A1 * | 10/2005 | Stark | G11C 7/1003 |
| | | | 375/354 |
| 2006/0045020 A1 * | 3/2006 | Picco et al. | 370/249 |
| 2006/0045053 A1 * | 3/2006 | Erlich et al. | 370/338 |
| 2006/0053216 A1 * | 3/2006 | Deokar et al. | 709/223 |
| 2006/0055441 A1 * | 3/2006 | McClannahan et al. | 327/158 |
| 2006/0097863 A1 * | 5/2006 | Horowitz et al. | 340/521 |
| 2006/0114978 A1 * | 6/2006 | Rottacker | G01R 31/31922 |
| | | | 375/226 |
| 2006/0153245 A1 | 7/2006 | Schultze | |
| 2007/0025241 A1 * | 2/2007 | Nadeau | H04L 12/4633 |
| | | | 370/229 |
| 2007/0096787 A1 * | 5/2007 | Heightley | H03K 5/135 |
| | | | 327/276 |
| 2008/0240321 A1 * | 10/2008 | Narus et al. | 375/356 |
| 2009/0290572 A1 * | 11/2009 | Gonia et al. | 370/350 |
| 2009/0302917 A1 * | 12/2009 | Okamoto | G01R 31/3016 |
| | | | 327/231 |
| 2010/0074383 A1 * | 3/2010 | Lee | H04J 3/0667 |
| | | | 375/354 |
| 2010/0103781 A1 * | 4/2010 | Rai | H04J 3/0667 |
| | | | 368/55 |
| 2011/0022734 A1 * | 1/2011 | Etheridge et al. | 709/248 |
| 2011/0075685 A1 * | 3/2011 | Xu | H04L 27/2663 |
| | | | 370/503 |
| 2012/0063447 A1 * | 3/2012 | Tyrrell et al. | 370/350 |
| 2012/0269204 A1 * | 10/2012 | Zampetti | 370/503 |
| 2012/0319749 A1 * | 12/2012 | Thaller | H03L 7/183 |
| | | | 327/158 |

OTHER PUBLICATIONS

Lamport, Leslie. "Paxos made simple." ACM Sigact News 32.4 (2001): 18-25.*
Mamakos, Louis, et al. "A method for transmitting PPP over Ethernet (PPPoE)." (1999). https://tools.ietf.org/html/rfc2516.*
Mills, David L. "Improved algorithms for synchronizing computer network clocks." IEEE/ACM Transactions on Networking (TON) 3.3 (1995): 245-254.*
WildPackets, "Propagation Delay," Feb. 20, 2011, http://web.archive.org/web/20110220015404/http://www.wildpackets.com/resources/compendium/ethernet/propagation_delay.*
IPextreme, "Multiple Reference Clock Generator;" Aug. 2007, http://www.maojet.com.tw/files/PDF/IP/IPextreme_Multiple%20Reference%20Clock%20Generator.pdf.*
Cheng, Jia, "A Delay-Locked Loop for Multiple Clock Phases/Delays Generation," Dec. 2005, https://smartech.gatech.edu/bitstream/handle/1853/7470/jia_cheng_200512_phd.pdf.*
International Search Report for PCT/FR2012/051945, dated Oct. 5, 2012.

* cited by examiner

METHOD FOR SYNCHRONISING A SERVER CLUSTER AND SERVER CLUSTER IMPLEMENTING SAID METHOD

The present invention concerns a method for synchronising a server cluster and a server cluster implementing said method.

It relates more precisely to a server cluster comprising a plurality of nodes each provided with an internal clock and interconnected with each other by a clock interconnection network, this clock interconnection network comprising a plurality of transmission segments connecting the nodes together.

A server cluster of this type generally takes the form of a computer installation comprising several computers in a network, appearing from the outside as a computer with very high computing power, referred to as a high performance computing (HPC) computer. An optimised installation of this type enables the distribution of complex processing operations and/or parallel computations on at least some of the nodes in the cluster.

All the computers/calculators in the server cluster, the management modules of the chassis in which they are generally integrated and the management modules of the computer racks in which these chassis are themselves generally integrated constitute all the nodes in this cluster, the term "node" designating a computer or a management module that may comprise one or more processing units. Two types of nodes can then be distinguished: the computing nodes and the service nodes. The computing nodes are those that actually execute the various instructions of complex processing operations and/or parallel computations, under the supervision of the service nodes.

For such a server cluster to be properly synchronised, is it necessary for the internal clocks of each of its nodes to be at the same common oscillation frequency, but this does not suffice. It is also necessary to ensure that they all have the same time-stamping information at each instant and as precisely as possible.

The nodes in a server cluster are in general all connected to the same first data packet transmission network, for example an Ethernet network for the general administration of the server cluster. It is for example among other things through this network that event notification messages pass, such as fault, error or other alert notifications. A master server connected to this Ethernet administration network, controlled by an internal reference clock, can thus proceed with a synchronisation of all the nodes by diffusing, by means of an NTP (Network Time Protocol) protocol, time-stamping information from its reference. However, the transmission by this Ethernet network is not deterministic so that the time for transmitting from one node to another may be very variable and fairly great. For example, by NTP, it is difficult to obtain transmission of time-stamping information to each of the nodes with a precision less than around a hundred microseconds.

For executing complex computations at high speed, the nodes in a server cluster are also generally interconnected with each other by a second network designed for transmitting computation data of complex processing operations and/or parallel computations. This computation data management network, used for executing computations at high speed by means of several computers acted on in parallel, is of very high performance in terms of transmission speed since these data may thus be transmitted in less than one microsecond from one node to another in the server cluster. However, such a network is generally not acted on in order to transmit time-stamping information since it is liable to find itself regularly in an overrun situation during critical computation phases.

The nodes in a server cluster may also be interconnected with each other by one or more other networks optionally dedicated to certain tasks and independent of the first and second networks.

At least one of the networks connecting together the nodes in the server cluster, whether it be the first general administration network, the second computation data management network or one of the other optional networks, comprises a plurality of transmission segments each connecting point to point two elements of the server cluster such as two rows of computer racks, two computer racks in the same row, two chassis in the same rack or two computers on the same chassis and is advantageously used for transmitting time-stamping information with a view to synchronising the nodes in the server cluster. It is this network that is referred to as the clock interconnection network.

Moreover, each message passing through one of these networks, in particular each notification message, comprises time-stamping information (transmission instant) supplied by the internal clock of the node that sends it, the resolution of this time-stamping information being able to be less than 100 ns.

However, because of the number of such messages that may be sent almost simultaneously by several nodes and the importance of good knowledge of the succession of these messages in order to solve any problems detected and for debugging, in the light furthermore of the aforementioned performances of the first general administration network, coherence between the internal clocks of the nodes in the server cluster becomes a major problem when this can be ensured only by the first network. It would be necessary in fact to be able to ensure a precision of much less than around ten microseconds, or even a few fractions of microseconds, in the transmission of the common time-stamping information to all the nodes.

It is therefore advantageous to transmit this time-stamping information by means of the clock interconnection network, whether or not it be independent of the first or second network, and to proceed as follows:

generation of time-stamping information by the internal clock of a source chosen from the nodes in the server cluster, transmission of this time-stamping information, by the transmission segments of the clock interconnection network, to all the nodes in the server cluster from the source, and adjustment of the internal clock of each node in the server cluster from this time-stamping information.

To prevent any offset in the reception of the time-stamping information from one node to another, the most immediate solution and the technically most simple one is to design the clock interconnection network around said source, each node being directly connected to the source by a transmission segment and all the transmission segments being identical, in particular of the same length. Obviously this solution cannot be envisaged in practice because of the conventional configuration of the server clusters in rows of computer racks as well as dispersions of propagation times in the input/output components of the transmission segments.

Other solutions may be envisaged on the basis of functionalities such as those proposed by the emerging protocols IEEE 1588 PTP or IEEE 802.3 EtherCAT for correcting the time-stamping information received by each node according to an estimation of the time taken by this information to reach it from the source. However, these solutions use a fairly complex methodology.

It may thus be desired to provide a method for synchronising a server cluster that dispenses with at least some of the aforementioned problems and constraints, in particular which affords sufficiently precise coherence of the internal clocks of the various nodes in the server cluster while remaining relatively simple to implement.

The subject matter of the invention is therefore a method for synchronising a server cluster comprising a plurality of nodes each provided with an internal clock and interconnected with each other by a clock interconnection network, this clock interconnection network comprising a plurality of transmission segments connecting the nodes together, the method comprising the following steps:

generation of time-stamping information by the internal clock of a source chosen from the nodes in the server cluster, transmission, by the transmission segments of the clock interconnection network, of this time-stamping information to all the nodes in the server cluster from the source, adjustment of the internal clock of each node in the server cluster from this time-stamping information, characterized in that it further comprises the following steps:

adjustment of the time for transmitting time-stamping information by each transmission segment to a constant value established for each transmission segment, on reception of the time-stamping information by any one of the nodes in the server cluster, adjustment of its internal clock from the time-stamping information and information relating to the transmission segments passed through between the source and this node.

Thus, even if the nodes do not all receive the time-stamping information at the same moment, it is possible for each node, by virtue of the invention, to determine precisely the time taken by this information in order to reach it from the source, so that it becomes possible to take account of this in the setting of its internal clock with respect to that of the source. All the internal clocks can then be adjusted to the same time with very good precision.

Optionally, the adjustment of the transmission time of any one of the transmission segments is effected by means of at least one delay line adjusted so as to align the phase of a signal carrying the time-stamping information to the phase of a reference signal internal to the nodes oscillating at a frequency corresponding to a common oscillation frequency of all the internal clocks of the nodes in the server cluster.

Optionally also, the transmission time of any one of the transmission segments is adjusted by means of two delay lines slaved according to a phase difference measured between a data frame, intended to be supplied at the input of one of the two delay lines in the direction of transmission of the time-stamping information, and an echo of this data frame, supplied at the output of the other one of the two delay lines in the opposite direction of transmission of the time-stamping information.

Optionally also, the slaving values of the two delay lines of any one of the transmission segments are determined differently from each other according also to a phase difference measured at the output of this transmission segment in the direction of transmission of the time-stamping information between the data frame supplied as an output of one of the two delay lines and a local predetermined phase reference.

Optionally also, the transmission time value established for each transmission segment is the same common maximum value established for all the transmission segments.

Optionally also, said same common maximum value established for all the transmission segments is obtained by an adjustment of the delay lines such that the phase of a signal carrying the time-stamping information is aligned on the rising or falling edges of the reference signal, the latter oscillating about an intermediate frequency, for example 1 MHz.

Optionally also, the information relating to the transmission segments passed through between the source and any one of the nodes in the server cluster for transmitting the time-stamping information comprises the number of transmission segments passed through between the source and this node.

Optionally also, a plurality of nodes, referred to as computing nodes, are able to execute application program instructions and operating system instructions, each of these computing nodes being programmed to execute the operating system instructions in predetermined time windows, these executions in these predetermined time windows being triggered by the internal clock of each computing node.

Optionally also, the predetermined time windows are the same for all the computing nodes.

Another subject matter of the invention is a server cluster comprising a plurality of nodes each provided with an internal clock and interconnected with each other by a clock interconnection network, this clock interconnection network comprising a plurality of transmission segments connecting the nodes together, the server cluster comprising:

a source, chosen from nodes in the server cluster, comprising means for generating time-stamping information by means of its internal clock, means for the transmission, by the transmission segments of the clock interconnection network, of this time-stamping information to all the nodes in the server cluster from the source, means for adjusting the internal clock of each node in the server cluster from this time-stamping information, characterized in that it further comprises means for adjusting the time for transmitting the time-stamping information by each transmission segment to a constant value established for each transmission segment, and in that the internal clock adjustment means are designed to adjust the internal clock of each node in the server cluster from also information relating to the transmission segments passed through between the source and this node.

Optionally:

each node is included in a chassis, itself included in a computer rack, itself included in a row of computer racks, the server cluster comprising a plurality of rows of computer racks, the clock interconnection network comprises a plurality of segments interconnecting the rows together, segments for interconnecting together computer racks in the same row, segments for interconnecting together chassis in the same computer rack and segments for interconnecting together nodes in the same chassis, and the means for transmitting time-stamping information are able to transmit to each node in the server cluster, with this time-stamping information, at least one item of information relating to the number of segments for interconnecting rows passed through between the source and the node, the number of computer rack interconnection segments passed through between the source and this node and the number of chassis interconnection segments passed through between the source and this node.

Optionally also, the information relating to the transmission segments passed through between the source and any one of the nodes in the server cluster comprising at least one field indicating the number of segments interconnecting rows passed through between the source and this node, a field indicating the number of segments interconnecting computer racks passed through between the source and this node and a field indicating the number of chassis interconnection segments passed through between the source and this node, incrementation means are provided for implementing each of these fields as soon as a corresponding segment is passed through by a message including the time-stamping information intended for this node.

Optionally also, the server cluster comprising:
a first general administration network interconnecting all the nodes together, and
at least a second network managing computing data intended to be exchanged between the nodes, interconnecting at least some of the nodes together,
said clock interconnection network is a supplementary network, distinct from the general administration network and the computing data management network, in particular a network implementing the HDLC protocol.

Figure 2:
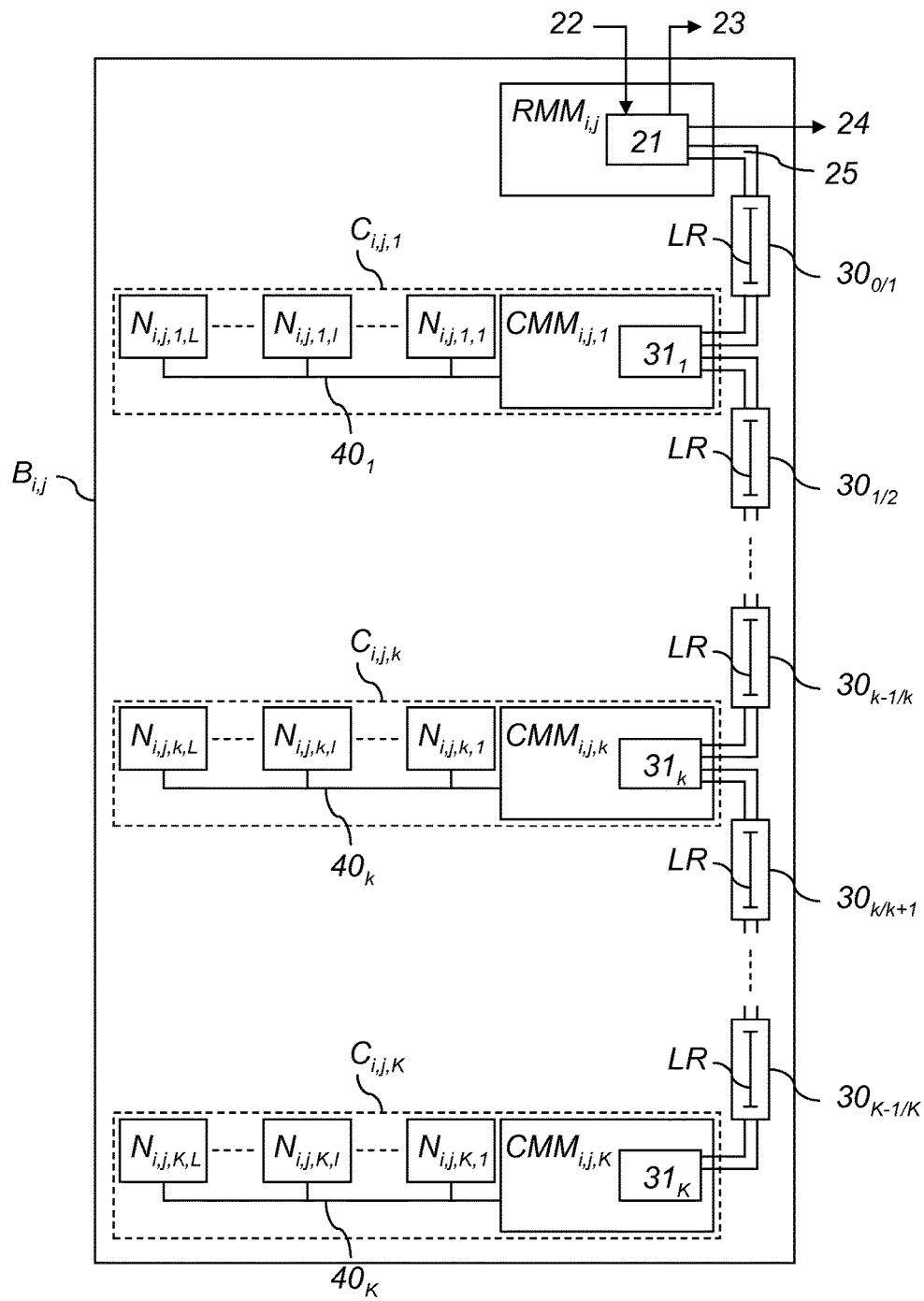
Figure 3:
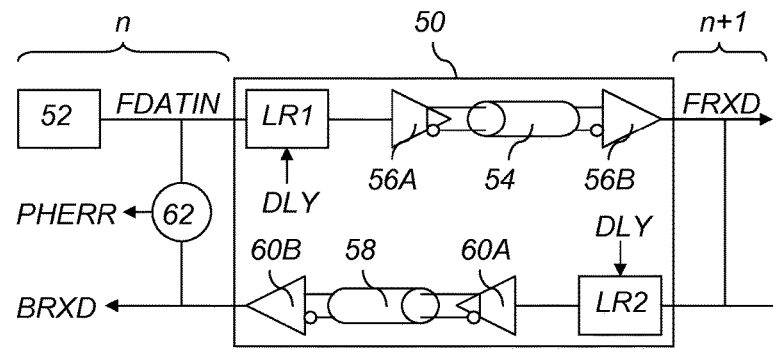
Figure 4:
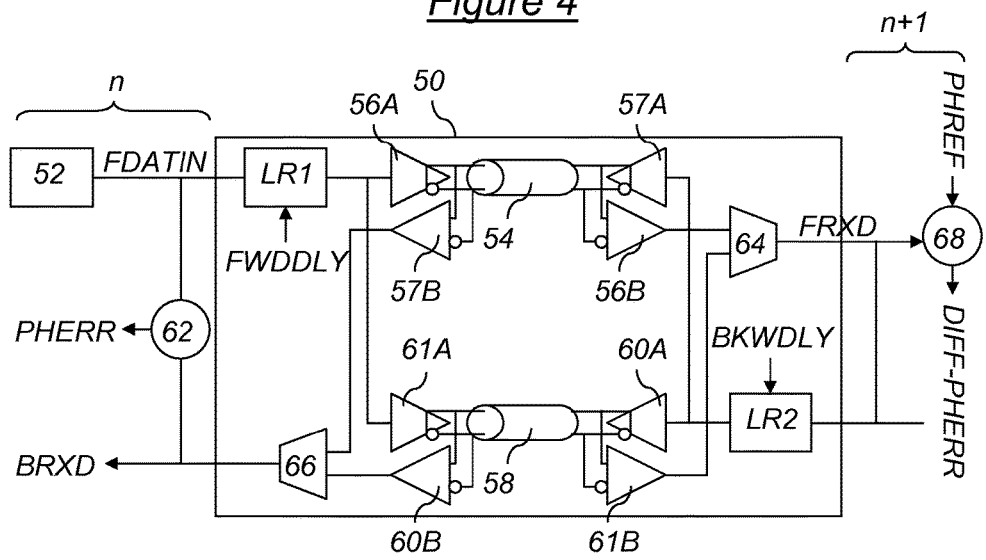
Figure 5:
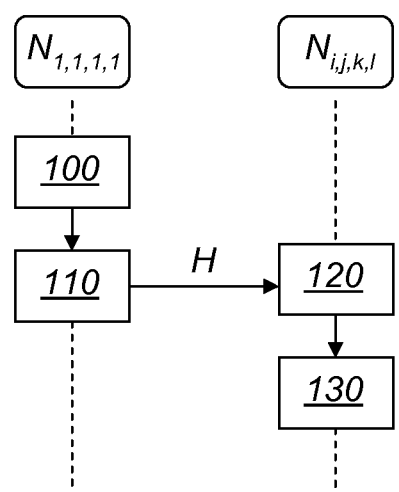
Figure 6:
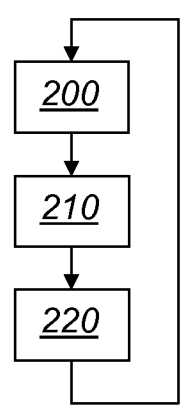

The invention will be better understood by means of the following description, given solely by way of example and made with reference to the accompanying drawings, in which:

FIG. 1 shows schematically the general structure of a server cluster according to one embodiment of the invention, FIG. 2 details schematically the general structure of a computer rack of the server cluster of FIG. 1, FIGS. 3 and 4 show schematically two embodiments of transmission segments of the server cluster of FIG. 1, FIG. 5 illustrates the successive steps of a method for synchronising the server cluster of FIG. 1, and FIG. 6 illustrates, by means of a succession of steps, a general operating principle of the cluster server of FIG. 1.

The server cluster 12 illustrated in FIG. 1 comprises a plurality of computer racks denoted $B_{i,j}$ according to the position thereof. This server cluster is for example organised in several rows R1, . . . , Ri, . . . RI, each of these rows comprising at least one computer rack. It should be noted that the number of racks per row is not necessarily identical from one row to another. Thus, in the example illustrated in FIG. 1, the first row of racks R1 comprises J1 computer racks denoted $B_{1,1}$, . . . , $B_{1,J1}$, the $i^{th}$ row Ri comprises Ji computer racks denoted $B_{i,1}$, . . . , $B_{i,Ji}$ and the last row of racks RI comprises JI computer racks denoted $B_{I,1}$, . . . , $B_{I,JI}$. In particular, the $j^{th}$ computer rack of the $i^{th}$ row RI is denoted $B_{i,j}$.

As will moreover be detailed with reference to FIG. 2, each computer rack itself comprises at least one chassis, each chassis of each computer rack itself comprising at least one computer, that is to say a computer node. Such a computer is, as already indicated previously, a node in the server cluster 12 and comprises one or more processing units. It further comprises, as is known per se, an internal clock for timing its processing operations in plesiochronous mode. According to this conventional architecture, each node in the server cluster 12 is therefore included in a chassis, itself included in a computer rack, itself included in one of the rows R1, . . . , Ri, . . . RI.

The server cluster 12 is intended to be connected to a dorsal network (not shown) generally referred to as a backbone network and it thus appears from the outside, that is to say from the point of view of a control terminal also connected to the backbone network, to be a single HPC computer entity.

Some of the nodes in the server cluster 12 are service nodes, for example chassis management modules and computer rack management modules. Some dedicated computers of the server cluster also form part of this: for example a processing interface, referred to as the Login interface, a general administration server, a server managing data describing the cluster, an input/output management server and a backup server. The majority of these dedicated computers are duplicated for security reasons. The other nodes in the server cluster 12 are computing nodes the activity of which is managed in particular by the general administration server.

The various aforementioned nodes in the server cluster 12 are interconnected together by means of several networks.

Optionally, one or more service networks (not illustrated) may specifically connect fast computing servers to each other in order to constitute one or more sub-networks in which the service data transfers are accelerated. They may take the form of bus, ring or meshed networks or according to other known topologies.

Moreover, an administration network (not illustrated), in general of the Ethernet type, makes it possible to connect the general administration server of the server cluster 12 to all the other nodes. Optionally, this general administration network may be duplicated by a primary control network dedicated to powering up, starting, stopping and processing of certain predetermined primary errors, referred to as fatal errors and generating Core files, of the servers that it administers. Such a general administration network has for example a rate of around 100 Mbits/s.

Finally, one or more other networks, referred to as computing data management networks, connect together at least all the computing nodes, or even all the computing and service nodes, in the server cluster 12. They have very high rate characteristics compared with the rate characteristics of the administration network. It is in fact through this or these computing data management network(s) that there pass among other things the computing data necessary for executing the processing instructions transmitted to the server cluster 12. They may take the form of networks in a tree (of the tree or fat-tree type), ring, mesh or according to other known topologies. Such computing data management networks have for example a rate of around 40 Gbits/s.

As indicated previously, at least one of the networks connecting the nodes in the server cluster, whether it be the service network or networks, the administration network, the computing data management network or networks, or any other dedicated network, comprises a plurality of transmission segments each connecting point-to-point two elements in the server cluster such as two rows of computer racks, two computer racks in the same row, two chassis in the same rack or two computers in the same chassis. This network is, in the remainder of the description, referred to as a clock interconnection network and will be used advantageously for the synchronised transmission of time-stamping information. It uses for example the HDLC protocol for transmitting time-stamping information. If it is a case of a dedicated network different from the general administration network and computing data management networks, it may for example have a rate of around 1 Mbits/s.

At a first level illustrated in FIG. 1, and by way of non-limitative example, the clock interconnection network comprises a plurality of transmission segments $10_{1/2}$, . . . , $10_{i-1/i}$, $10_{i/i+1}$, ..., $10_{I-1/I}$ for an interconnection of rows R1, ..., Ri, ... RI together in pairs: more precisely, the segment $10_{1/2}$ connects the rows R1 and R2 together by their first racks $B_{1,1}$ and $B_{2,1}$, ... the segment $10_{i-1/i}$ connects the rows Ri−1 and Ri together by their first racks $B_{1,1}$ and $B_{2,1}$, ... the segment $10_{i-1/i}$ connects the rows Ri and Ri+1 together by their first racks $B_{i,1}$ and $B_{i+1,1}$, ... and the segment $10_{i/i+1}$ connects the rows RI−1 and RI together by their first racks $B_{I-1,1}$ and $B_{I,1}$.

The transmission segments $10_{1/2}$, ..., $10_{i-1/i}$, $10_{i/i+1}$, ..., $10_{I-1/I}$ comprise for example cables each of approximately 10 meters that are a priori able to transmit data in one direction or the other at transmission times that are different from each other and different from one transmission direction to the other: these transmission times are generally less than 100 ns for these 10 meter cables. The transmission segments $10_{1/2}$, ..., $10_{i-1/i}$, $10_{i/i+1}$, ..., $10_{I-1/I}$ also comprise means LR for adjusting their transmission time to a constant value established for each transmission segment. These adjustment means LR comprise for example delay lines: a delay line is in fact an electronic device wherein a signal passes from the input to the output in a period of time defined in advance. This time period may be common to all the delay lines. Any one of the transmission segments $10_{1/2}$, ..., $10_{i-1/i}$, $10_{i/i+1}$, ..., $10_{I-1/I}$, provided with these adjustment means LR will be detailed with reference to FIGS. 3 and 4.

At a second level illustrated in FIG. 1, and by way of non-limitative example, the clock interconnection network further comprises a plurality of transmission segments $20_{1,1/2}$, ..., $10_{1,J1-1/J1}$ for an interconnection of the computer racks of the first row R1 together in pairs, a plurality of transmission segments $20_{i,1/2}$, ..., $20_{i,Ji-1/Ji}$ for an interconnection of the computer racks of the $i^{th}$ row Ri together in pairs, and a plurality of transmission segments $20_{I,1/2}$, ..., $20_{I,JI-1/JI}$ for an interconnection of the computer racks of the last row RI together in pairs: more precisely, the segment $20_{1,1/2}$ connects the computer racks $B_{1,1}$ and $B_{1,2}$ together, the segment $20_{1,J1-1/J1}$ connects the computer racks $B_{1,J1-1}$ and $B_{1,J1}$ together, the segment $20_{i,1/2}$ connects the computer racks $B_{i,1}$ and $B_{i,2}$ together, the segment $20_{i,j-1/j}$ connects the computer racks $B_{i,j-1}$ and $B_{i,j}$ together, the segment $20_{i,j/j+1}$ connects the computer racks $B_{i,j}$ and $B_{i,j+1}$ together, ... the segment $20_{i,Ji-1/Ji}$ connects the computer racks $B_{i,Ji-1}$ and $B_{i,Ji}$ together, the segment $20_{I,1/2}$ connects the computer racks $B_{I,1}$ and $B_{I,2}$ together, ... and the segment $20_{I,JI-1/JI}$ connects the computer racks $B_{I,JI-1}$ and $B_{I,JI}$ together.

The transmission segments $20_{1,1/2}$, ..., $20_{1,J1-1/J1}$, ... $20_{i,1/2}$, ..., $20_{i,Ji-1/Ji}$, $20_{I,1/2}$, ..., $20_{I,JI-1/JI}$ comprise for example cables each of approximately 1 meter that are able a priori to transmit data at transmission times different from one another and different from one transmission direction to the other: these transmission times are generally 5 to 10 ns for these 1 meter cables. The transmission segments $20_{1,1/2}$, ..., $20_{1,J1-1/J1}$, ... $20_{i,1/2}$, ..., $20_{i,Ji-1/Ji}$, $20_{I,1/2}$, ..., $20_{I,JI-1/JI}$ further comprise means LR for adjusting their transmission time to a constant value established for each transmission segment. These adjustment means LR comprise for example delay lines.

The delay lines of the first and second level segments can be adjusted to align the phases of the signals that pass through them, in particular the signal phases carrying time-stamping information, on reference signal phases internal to the nodes oscillating at the same frequency, this frequency corresponding for example to a common oscillation frequency of all the internal clocks of the nodes in the server cluster. This common oscillation frequency is for example centred on 1 MHz. In this case the delay lines can be adjusted to align the phases of the signals carrying time-stamping information on the rising or falling edges of the reference signals that are separated by 1 μs (that is to say 500 ns-0.5 UI (Unit Interval) for the duration of one bit—in the cables and delay lines, and 500 ns-0.5 UI—in the programmable logic circuits at the ends of these cables). As this microsecond is appreciably greater than the various possible transmission times of the first and second level transmission segments, it becomes possible to impose, by means of the delay lines, the same common maximum value (i.e. 1 μs) of transmission of all the first and second level segments. Thus the design of the means LR of adjusting the transmission segments $20_{1,1/2}$, ..., $20_{1,J1-1/J1}$, ... $20_{i,1/2}$, ..., $20_{i,Ji-1/Ji}$, $20_{I,1/2}$, ..., $20_{I,JI-1/JI}$ may be identical to that of the first-level segments, as will be detailed with reference to FIGS. 3 and 4.

The structure of the server cluster 12, as described previously with reference to FIG. 1, is suitable for implementing the invention, but other possible configurations of clusters, in particular of the HPC computer type, comprising all or some of the aforementioned elements, or even comprising other elements in the case of greater complexity and interconnected differently, are also suitable.

FIG. 2 illustrates in detail the general structure of any one of the computer racks of FIG. 1, denoted $B_{i,j}$.

This computer rack $B_{i,j}$ comprises a rack-management module $RMM_{i,j}$. It further comprises a plurality of superimposed chassis $C_{i,j,1}$, ..., $C_{i,j,k}$, ... $C_{i,j,K}$. Each chassis comprises its own chassis management module $CMM_{i,j,1}$, ..., $CMM_{i,j,k}$, ... $CMM_{i,j,K}$ and a plurality of computers forming the nodes in the server cluster 12. To simplify the notations, it is considered, in the example of FIG. 2, that all the chassis in the computer rack $B_{i,j}$ comprise the same number L of nodes, but in reality this number may be entirely different from one chassis to another and from one rack to another. Thus, in accordance with what is illustrated, the chassis $C_{i,j,1}$ comprises L nodes $N_{i,j,1,1}$, ..., $N_{i,j,1,l}$, ... $N_{i,j,1,L}$, the chassis $C_{i,j,k}$ comprises L nodes $N_{i,j,k,1}$, ..., $N_{i,j,K,l}$, $N_{i,j,k,L}$ and the chassis $C_{i,j,K}$ comprises L nodes $N_{i,j,K,1}$, ..., $N_{i,j,K,l}$, ... $N_{i,j,K,L}$.

The rack-management module $RMM_{i,j}$ comprises a programmable logic circuit 21 enabling the exchange of data between the computer rack $B_{i,j}$ and other racks in the server cluster 12 through the clock interconnection network. This logic circuit 21 comprises functionally in general terms one input 22 and three outputs 23, 24 and 25.

The input 22 is designed to connect the management module $RMM_{i,j}$ of the rack $B_{i,j}$ to the management module of another rack in the server cluster in question as situated upstream of the rack $B_{i,j}$ in the direction of a broadcasting of time-stamping information in the server cluster. According to the installation illustrated in FIG. 1 and arbitrarily choosing the computer rack $B_{1,1}$ as the source for generating and broadcasting such time-stamping information, the rack situated upstream of the computer rack $B_{i,j}$ is $B_{i-1,1}$ if j=1 (that is to say when at the row head) and $B_{i,j-1}$ if j>1. Consequently the input 22 is designed to connect the management module $RMM_{i,j}$ of the rack $B_{i,j}$ to the management module $RMM_{i-1,1}$ of the rack $B_{i-1,1}$ if j=1 and to the management module $RMM_{i,j-1}$ of the rack $B_{i,j-1}$ if j>1.

The output 23 is designed to connect the management module $RMM_{i,j}$ of the rack $B_{i,j}$ to the management module of another rack in the server cluster in question as situated downstream of the rack $B_{i,j}$ in the direction of broadcasting of time-stamping information in the server cluster. If such a rack exists, and in accordance with the broadcasting direction chosen, the output 23 connects the management module $RMM_{i,j}$ of the rack $B_{i,j}$ to the management module $RMM_{i,j+1}$ of the rack $B_{i,j+1}$.

The output 24 is useful to the first racks $B_{i,1}$ of each row Ri, for any i<I. It is designed to connect the management module $RMM_{i,1}$ of the rack $B_{i,1}$ to the management module $RMM_{i+1,1}$ of the rack $B_{i+1,1}$, considered as situated downstream in the broadcasting direction of the example in FIG. 1.

Finally, the output 25 makes it possible, at a third level of the clock interconnection network, to connect the management module $RMM_{i,j}$ of the rack $B_{i,j}$ to the chassis $C_{i,j,1}, \ldots, C_{i,j,k}, \ldots C_{i,j,K}$ of this same rack. At this third level illustrated in FIG. 2, and by way of a non-limitative example, the clock interconnection network comprises a plurality of transmission segments $30_{0/1}, 30_{1/2}, \ldots, 30_{k-1/k}, 30_{k/k+1}, \ldots, 30_{K-1/K}$ for an interconnection of the chassis $C_{i,j,1}, \ldots, C_{i,j,k}, \ldots C_{i,j,K}$ together in pairs and connection thereof to the management module $RMM_{i,j}$: more precisely, the segment $30_{0/1}$ connects the management module $RMM_{i,j}$ of the rack $B_{i,j}$ to the management module $CMM_{i,j,1}$ of the chassis $C_{i,j,1}$, the segment $30_{1/2}$ connects the management module $CMM_{i,j,1}$ of the chassis $C_{i,j,1}$ to the management module $CMM_{i,j,2}$ of the chassis $C_{i,j,2}$, the segment $30_{k-1/k}$ connects the management module $CMM_{i,j,k-1}$ of the chassis $C_{i,j,k-1}$ to the management module $CMM_{i,j,k}$ of the chassis $C_{i,j,k}$, the segment $30_{k/k+1}$ connects the management module $CMM_{i,j,k}$ of the chassis $C_{i,j,k}$ to the management module $CMM_{i,j,k+1}$ of the chassis $C_{i,j,k+1}$, and the segment $30_{K-1/K}$ connects the management module $CMM_{i,j,K-1}$ of the chassis $C_{i,j,K-1}$ to the management module $CMM_{i,j,K}$ of the chassis $C_{i,j,K}$. In concrete terms, the management module $CMM_{i,j,k}$ of each chassis $C_{i,j,k}$ comprises a programmable logic circuit $31_k$ functionally comprising an input connected to the transmission segment $30_{k-1/k}$ and an output connected (except for $CMM_{i,j,K}$) to the transmission segment $30_{k/k+1}$.

The transmission segments $30_{0/1}, 30_{1/2}, \ldots, 30_{k-1/k}, 30_{k/k+1}, \ldots, 30_{K-1/K}$ comprise for example cables each of approximately 50 centimeters that are a priori able to transmit data at transmission times that are different from one another and different from one transmission direction to the other: these transmission times are generally 2.5 to 5 ns for these 50 centimeter cables. The transmission segments $30_{0/1}, 30_{1/2}, \ldots, 30_{k-1/k}, 30_{k/k+1}, \ldots, 30_{K-1/K}$ further comprise means LR for adjusting the transmission times thereof to a constant value established for each transmission segment. These adjustment means LR comprise for example delay lines.

The delay lines of the third-level segments can also be adjusted in order to align the phases of the signals carrying time-stamping information on the phases of reference signals internal to the nodes oscillating at the same frequency, this frequency corresponding for example to the common oscillation frequency of all the internal clocks of the nodes of the server cluster, imposing, as for the first and second level segments, the same common maximum value (i.e. 1 µs) of transmission of each third-level segment. Thus the design of the means LR of adjusting the transmission segments $30_{0/1}, 30_{1/2}, \ldots, 30_{k-1/k}, 30_{k/k+1}, \ldots, 30_{K-1/K}$ can be identical to that of the first and second level transmission segments, as will be detailed with reference to FIGS. 3 and 4.

At a fourth level illustrated in FIG. 2, and by way of non-limitative example, the clock interconnection network comprises a plurality of transmission segments $40_1, \ldots, 40_k, \ldots, 40_K$ for interconnection of the computers of each chassis together and connection thereof to the management module $CMM_{i,j,k}$ of the relevant chassis: more precisely, the segment $40_1$ is for example a multipoint computer backplane bus that connects the management module $CMM_{i,j,1}$ of the chassis $C_{i,j,1}$ to all the computers $N_{i,j,1,1}, \ldots, N_{i,j,1,l}, \ldots N_{i,j,1,L}, \ldots$ the segment $40_k$ is for example a multipoint computer backplane bus that connects the management module $CMM_{i,j,k}$ of the chassis $C_{i,j,k}$ to all the computers $N_{i,j,k,1}, \ldots, N_{i,j,k,l}, \ldots N_{i,j,k,L}, \ldots$ and the segment $40_K$ is for example a multipoint computer backplane bus that connects the management module $CMM_{i,j,K}$ of the chassis $C_{i,j,K}$ to all the computers $N_{i,j,K,1}, \ldots, N_{i,j,K,l}, \ldots N_{i,j,K,L}$.

The multipoint buses $40_1, \ldots, 40_k, \ldots, 40_K$ are for example each a priori able to transmit data to all the nodes to which they are connected in less than 2 or 3 ns. Thus, in accordance with the precision level required for suitable synchronisation in the majority of applications of the invention that can be envisaged, this transmission time can be ignored. In a variant, it could a priori be fixed at predetermined values equally distributed between 0 and 2 to 3 ns for each node.

In a variant also, the multipoint buses $40_1, \ldots, 40_k, \ldots, 40_K$ could be replaced by a succession of cables each provided with means LR for adjusting the transmission time thereof to a constant value. We would thus return to the situation of the first, second and third level transmission segments.

The structure of the computer rack $B_{i,j}$, as described previously with reference to FIG. 2, is appropriate for implementing the invention, but other possible configurations of racks comprising all or some of the aforementioned elements, or even comprising other elements in the case of greater complexity and differently interconnected, are also suitable.

As illustrated in FIG. 3, any one of the first, second or third level transmission segments of the clock interconnection network, designated by the general reference 50, can be designed by means of delay lines for imposing a constant transmission time. This transmission segment 50 connects two programmable logic circuits of two rack or chassis management modules, identified by the general references n and n+1 in this figure.

According to the embodiment illustrated in FIG. 3, in the direction of a transmission of a data frame from the circuit n to the circuit n+1, the circuit n supplies, at the output of a flip-flop 52, a data frame FDATIN to the transmission segment 50. This data frame FDATIN is received by a first delay line LR1 of the transmission segment 50, designed in the form of a Delay Locked Loop (DLL), slaved by an adjustable delay value DLY. It is then transmitted in an "outward" cable portion 54 of the transmission segment 50 for supply of a frame FRXD to the circuit n. Two line amplifiers 56A and 56B, referred to respectively as sending differential buffer and reception differential buffer, are disposed respectively at the input and output of the cable portion 54 in the direction of transmission from the circuit n to the circuit n+1.

In the reverse direction of transmission of the data frame FDATIN, an echo is generated when the frame FRXD is received by the circuit n. This echo is received by a second delay line LR2 of the transmission segment 50, also designed in the form of a DLL (Delay Locked Loop), slaved by the same adjustable delay value DLY. It is next transmitted in a "return" cable portion 58 of the transmission segment 50 for the supply of a frame BRXD to the circuit n. Two line amplifiers 60A and 60B, referred to respectively as sending differential buffer and reception differential buffer, are disposed respectively at the input and output of the cable portion 58 in the direction of transmission from the circuit n+1 to the circuit n.

The circuit n further comprises a phase comparator 62 that compares the beginnings of frames FDATIN and BRXD in order to supply a phase-shift signal PHERR. Depending on the value of this signal PHERR, it adjusts the delay value DLY so as to tend towards a phase-difference value equal to a clock period, that is to say 1 µs. In this way, the time for transmission of the data frame in the transmission segment converges towards 500 ns. In practice, the value is 500 ns +/−0.5 ns. By adding a processing time of 500 ns +/−0.5 ns also in the transmission circuit n, a constant global transmission time is obtained, via the transmission segment 50, of 1 µs +/−1 ns.

According to another embodiment illustrated in FIG. 4, an improvement can be made optionally in the design of the transmission segment 50 in order to take account of dispersions in the cable portions 54, 58 and in the circuits n, n+1. In accordance with this other embodiment, the cable portions can transmit selectively in both directions according to a binary instruction DIR controlled by the circuit n.

In addition to the elements already described with reference to FIG. 3, two line amplifiers 57A and 57B, referred to respectively as sending differential buffer and reception differential buffer, are disposed respectively on either side of the cable portion 54 in the direction of transmission from the circuit n+1 to the circuit n. Two other line amplifiers 61A and 61B, referred to respectively as sending differential buffer and reception differential buffer, are disposed respectively on either side of the cable portion 58 in the direction of transmission from the circuit n to the circuit n+1.

The output of first delay line LR1 is connected to the inputs of the line amplifiers 56A and 61A. The output of the second delay line LR2 is connected to the inputs of the line amplifiers 60A and 57A. The outputs of the line amplifiers 56B and 61B are connected to the inputs of a multiplexor 64 supplying as an output the data frame FRXD. Finally, the outputs of the line amplifiers 60B and 57B are connected to the inputs of a multiplexor 66 supplying as an output the data frame BRXD. The multiplexor 64 is controlled by the instruction DIR so as to transmit the output of the of the line amplifier 56B when DIR=1 and the output of the line amplifier 61B when DIR=0. Likewise, the multiplexor 66 is controlled by the instruction DIR so as to transmit the output of the line amplifier 60B when DIR=1 and the output of the line amplifier 57B when DIR=0.

Finally, in the circuit n+1, a phase comparator 68 receives the data frame FRXD and compares it with any local phase reference PHREF in order to supply phase-difference information DIFF-PHERR in addition to PHERR. By dynamically alternating the values of DIR, in this way two different measurements are obtained that represent the asymmetry between the two possible transmission directions. This information is retransmitted from the circuit n+1 to the circuit n, which independently adjusts two different slaving values: the value FWDDLY for the first delay line LR1 and the value BKWDLY for the second delay line LR2.

In this way, the time for transmission of the data frame in the transmission segment converges towards 500 ns +/−0.5 ns even in the case of asymmetry in the transmission directions. By adding the processing time of 500 ns +/−0.5 ns also in the transmission circuit n, there also a constant global transmission time is obtained, via the transmission segment 50, of 1 µs +/−1 ns.

It should be noted that, in accordance with the structure proposed with reference to FIGS. 1 and 2, each node $N_{i,j,k,l}$ of the server cluster 12 is easily spatially beatable by a system of coordinates (i, j, k, l) directly related to the organisation of the transmission segments, i, j and k indicating the number of first, second and third level segments separating this node from a source chosen as being for example the node $N_{1,1,1,1}$ of the rack $B_{1,1}$. Thus, by adjusting the time for transmission of time-stamping information by each transmission segment to a constant value established for each transmission segment, it becomes easy to precisely synchronise all the nodes from the chosen source by taking account of the transmission segments passed through between the source and this node by the time-stamping information, these segments actually passed through depending directly or indirectly on the location (i, j, k, l) of each node.

A method for synchronisation of the server cluster 12 will therefore now be detailed with reference to FIG. 5.

In accordance with first step 100 of this method the node $N_{1,1,1,1}$ of the rack $B_{1,1}$ generates time-stamping information from its internal clock. This time-stamping information comprises the current time supplied by the internal clock with a precision that may be around a hundred nanoseconds or even less than this.

Next, during a transmission step 110, this time-stamping information is broadcast to all the other nodes in the server cluster 12. To reach any of the nodes $N_{i,j,k,l}$, it passes through a certain number of transmission segments from the source as far as the chassis in which this node is situated. If the time of a few nanoseconds taken by the time-stamping information to reach the node $N_{i,j,k,l}$ from the management module of its chassis $CMM_{i,j,k}$ is ignored, the time that it takes between the source and the node is the sum of the time taken to pass through each of the first, second and third level transmission segments concerned. Given that the transit time of each transmission segment is adjusted in a predetermined precise fashion by means of the delay lines LR, it suffices to know the transit actually followed by the time-stamping information in order to determine its transmission time.

Two cases are then possible.

If the configuration of the clock interconnection network is such that it is not possible a priori to know what path will be followed by the time-stamping information between the source and each destination node, then information relating to the transmission segments actually transmitted between the source and this node must be supplied with the time-stamping information. It can be supplied in the form of fields indicating the segments passed over, and these fields may be given gradually during transmission. In the example of the clock interconnection network in question, with three transmission segment levels, the information relating to the transmission segments actually passed through comprises a field indicating the number of segments interconnecting rows (i.e. of first level) passed through between the source and this node, a field indicating the number of segments interconnecting computer racks in the same row (i.e. of second level) passed through between the source and this node and a field indicating the number of chassis interconnection segments (i.e. of third level) passed through between the source and this node. Means of incrementation by hardware associated with each segment are then provided for the incrementation of each of these fields associated with time-stamping information as soon as a corresponding segment is passed through by a message including this time-stamping information. On arrival, it suffices to find the number of first, second and third level segments recorded in the aforementioned fields in order to derive therefrom the corresponding transmission time. More precisely, if in accordance with the aforementioned example all the first, second and third level transmission segments are adjusted to the same transmission time value, such as 1 µs, then it suffices even to know the total number of segments actually passed through. This approach, related to the geographical configuration of the clock interconnection network, is of course to be distinguished from an approach of logic identification of the path followed by the time-stamping information. Known commands of the "Traceroute" type in Unix or Linux make it possible to know a logic path followed by data by identifying the nodes passed through by their IP addresses, but do not make it possible to provide information relating to the segments concretely passed through in order to derive therefrom precisely the corresponding transmission time.

If the configuration of the clock interconnection network is such that it is possible a priori to know what path will be followed by the time-stamping information between the source and each destination node, then the information relating to the transmission segments passed over between the source and this node can be simply deduced from the position of the latter. More precisely, in the example illustrated in FIGS. 1 and 2, this information can be deduced from the indices i, j and k: between the source $N_{1,1,1,1}$ and the node $N_{i,j,k,1}$, (i−1) first-level segments, (j−1) second-level segments and k third-level segments are passed through. If furthermore, in accordance with the aforementioned example, all the first, second and third level transmission segments are set to the same transmission time value, such as 1 µs, then the total transmission time between the source $N_{1,1,1,1}$ and the node $N_{i,j,k,l}$ can be estimated precisely at (i+j+k−2)×1 µs. If the position of each node is not known from the nodes themselves, then it becomes necessary to return to the previous case wherein the fields provided for this purpose are given during transmission, in order to find the values of i, j and k.

During a step 120, any one of the destination nodes $N_{i,j,k,l}$ receives the time-stamping information. This reception triggers a step 130 of adjusting its internal clock from this time-stamping information and the aforementioned information relating to the transmission segments passed through between the source and this node. To repeat the notations of the previous paragraph, if H is the time-stamping information value supplied by the source, then the internal clock of the node $N_{i,j,k,l}$ is set to the value H+(i+j+k−2)×1 µs.

The previously described steps 100, 110, 120 and 130 are for example regularly repeated in order to maintain a good synchronisation of the internal clocks of the nodes of the server cluster 12 with acceptable precision for obtaining correct sequencing in the traces of events. Because of the elements given as an example, the synchronisation precision may attain a few nanoseconds, or at worst a few tens of nanoseconds. It may in any event be much less than a microsecond or even a hundred nanoseconds, which is sufficient in a large number of cases and much less than what could be obtained with synchronisation by Ethernet.

Once good synchronisation of the internal clocks is provided by means of the aforementioned method or any other equivalent synchronisation method, another known problem of server clusters can be solved. This is a problem of the "operating system noise" that results in a drop in performance of large server clusters.

The computing nodes of a server cluster are caused to execute two types of process: computing processes that are directly related to the computing instructions executed by the server cluster, on behalf of the users; the operating system processes which for their part are directly related to the operating systems of the computing nodes and independent of the computing instructions. By default, the operating system processes are caused to interrupt the computing processes in a more or less random fashion. However, the computing nodes of a server cluster generally function according to a so-called "bulk synchronisation" mode according to which independent computing phases executed by each computing node are followed by phases of data exchanges between computing nodes during which each computing node will itself seek the data that it requires in the memories of the others independently of their operating system. The data exchange phases are executed according to a data exchange protocol between the nodes of the RDMA (Remote Direct Memory Access) type and subject to passing a synchronisation barrier that ensures that the computing phases supplying the necessary data have all ended. Thus, when the number of computing nodes increases and the calculations are caused to be interrupted inopportunely by operating system processes in each node, the processing times increase and the performances drop. This is because any interruption of any node occurs independently of any interruptions of the other nodes, so that statistically the crossing of the successive synchronisation barriers is delayed overall.

A first solution for solving this problem of operating system noise is to deprogram the largest number of operating system processes, in particular those that in practice do not appear to be very useful a priori. But this solution is dangerous since it weakens the functioning of the server cluster overall.

Another solution consists of taking advantage of good synchronisation of the internal clocks of the computing nodes in order to impose any execution of the operating system processes in time windows defined in advance. The triggering of these executions in these predetermined time windows being carried out by the internal clock of each computing node, it becomes easy to optimize the correct execution of the instructions related to the operating systems when the nodes are correctly synchronised. In particular, these predetermined time windows may be the same for all the computing nodes.

Thus, the general operating principle of the server cluster 12 can follow the succession of steps illustrated in FIG. 6. During a main computing step 200, the computing nodes execute their computing processes according to various successive phases interrupted by data exchange phases. At a predetermined instant for all the computing nodes, the main computing step is interrupted (210) and operating system processes possibly put on standby during the main computing step in each node are executed. At another predetermined instant for all the computing nodes and subsequent to the previous one, the main computing step 200 resumes (220) interrupting the execution of the operating system processes. In this way, an optimum occupation rate of the computing nodes is ensured, but this of course assumes good prior synchronisation of the internal clocks. It is for this reason that such management of the operating system instructions advantageously takes advantage of the synchronisation method described previously. However, it should be noted that resolution of the problem of operating system noise by this method is independent of the synchronisation method according to the invention.

It is clear that a synchronisation method such as the one described with reference to FIG. 5 is both simple and efficient. By imposing a predetermined transmission time for the time-stamping information in each segment of the clock interconnection network, for example at a maximum value common for all the segments, this transmission is slowed but then the transmission time for each node in the server cluster is controlled deterministically, which ensures very precise synchronisation.

It should be noted moreover that the invention is not limited to the embodiment described previously. It will be clear in fact to a person skilled in the art that various modifications can be made to the embodiment described above in the light of the teaching that has just been disclosed to him.

In particular, in the example described previously, the times for transmission of the time-stamping information in each chassis have been ignored but could be taken into account in the same way as the transmission segments between rows, racks and chassis.

Moreover, the adjustment of the transmission time of the time-stamping information is not necessarily the same for all the transmission segments: a difference could be made between the transmission segments between rows, racks and chassis since they are a priori not of the same lengths: around 10 m for the segments between rows, 1 m for the segments between racks and 50 cm for the segments between chassis. This would make it possible to refine the adjustment and thus to accelerate the transmission of the time-stamping information.

More generally, in the following claims, the terms used must not be interpreted as limiting the claims to the embodiment disclosed in the present invention, but must be interpreted in order to include therein all equivalents that the claims aim to cover because of the working thereof and the foreseeing of which is within the capability of a person skilled in the art by applying his general knowledge to the implementation of the teaching that has just been disclosed to him.

The invention claimed is:

1. A method for synchronizing a server cluster comprising a plurality of nodes each provided with an internal clock and interconnected with each other by a clock interconnection network, said clock interconnection network comprising a plurality of cables or buses connecting the plurality of nodes together, wherein each cable or bus of said plurality of cables or buses forms part of a transmission segment, the method comprising:
   generating time-stamping information by the internal clock of a source chosen from the plurality of nodes in the server cluster;
   transmitting, by the cables or buses of the clock interconnection network, said time-stamping information to the plurality of nodes in the server cluster from the source;
   imposing, via at least one delay locked loop (DLL) of each transmission segment of the clock interconnection network, on the transmission segment a predetermined, constant transmissions time of the time-stamping information through the cable or bus of the transmission segment, wherein the imposed transmission time is a same, maximum value for the each transmission segment; and
   responsive to receiving the time-stamping information by any one of the plurality of nodes in the server cluster, adjusting the internal clock of said one node based on both the time-stamping information and information relating to the cables or buses traversing between the source and said one node, wherein the information relating to the cables or buses traversing between the source and said one node comprises a number of cables or buses traversing between the source and said one node such that a total transmission time is derived at said one node based on the number and the imposed transmission time.

2. The method for synchronising a server cluster according to claim 1, wherein said imposing of the constant transmission time is performed using at least one of the DLLs so as to align a phase of a signal carrying the time-stamping information to a phase of a reference signal internal to the plurality of nodes oscillating at a frequency corresponding to a common oscillation frequency of all the internal clocks of the plurality of nodes in the server cluster.

3. The method for synchronising a server cluster according to claim 2, wherein the imposition of the constant transmission time uses two DLLs which are slaved according to a phase difference measured between a data frame supplied at an input of one of the two DLLs in a direction of transmission of the time-stamping information, and an echo of said data frame supplied at an output of the other one of the two DLLs in an opposite direction of transmission of the time-stamping information.

4. The method for synchronising a server cluster according to claim 3, wherein the slaving values of the two DLLs of any one of the cables or buses are further determined differently from each other according to a phase difference measured at an output of said cable or bus in the direction of transmission of the time-stamping information between a data frame supplied as an output of one of the two DLLs and a predetermined local phase reference.

5. The method for synchronising a server cluster according to claim 2, wherein a transmission time value established for each cable or bus is a same common maximum value established for all the cables or buses, and
   wherein the same common maximum value established for all of the cables or buses is obtained by an adjustment of the DLLs, such that the phase of the signal carrying the time-stamping information is aligned on a rising or falling edges of the reference signal oscillating about an intermediate frequency.

6. The method for synchronising a server cluster according to claim 5, wherein said intermediate frequency is 1 MHz.

7. The method for synchronising a server cluster according to claim 1, wherein a transmission time value established for each cable or bus is a same common maximum value established for all of the cables or buses.

8. The method for synchronising a server cluster according to claim 7, wherein the information relating to the cables or buses traversing between the source and said one node comprises a number of cables or buses traversing between the source and said one node.

9. The method for synchronising a server cluster according to claim 7, wherein said same common maximum value established for all of the cables or buses is obtained by an adjustment of the DLLs such that the phase of the signal carrying the time-stamping information is aligned on a rising or falling edge of the reference signal oscillating about an intermediate frequency.

10. The method for synchronising a server cluster according to claim 9, wherein said intermediate frequency is 1 MHz.

11. The method for synchronising a server cluster according to claim 1, wherein a plurality of computing nodes are configured to execute application program instructions and operating system instructions, each said computing nodes being programmed to execute the operating system instructions in predetermined time windows, said executions in these predetermined time windows being triggered by the internal clock of each said computing node.

12. The method for synchronising a server cluster according to claim 11, wherein the predetermined time windows are the same for all the computing nodes.

13. The method for synchronising a server cluster according to claim 1, wherein each transmission segment is further formed by a plurality of line amplifiers.

14. A server cluster comprising:
a plurality of nodes each provided with an internal clock and interconnected with each other by a clock interconnection network, the clock interconnection network comprising a plurality of cables or buses connecting the nodes together, wherein each cable or bus of said plurality of cables or buses forms part of a transmission segment;
a source chosen, from said plurality of nodes in the server cluster, configured to generate time-stamping information using said internal clock of said source; and
the plurality of the cables or buses of the clock interconnection network configured to transmit said time-stamping information to the plurality of nodes in the server cluster from the source,
wherein, each of the cables or buses is configured to impose, via at least one delay locked loop (DLL) of each transmission segment of the clock interconnection network, on the transmission segment a predetermined, constant transmission time of the time stamping information through the cable or bus of the transmission segment, wherein the imposed transmission time is a same, maximum value for the each transmission segment, and
wherein, responsive to receiving the time-stamping information by any one of the plurality of nodes in the server cluster, adjusting the internal clock of said one node based on both the time-stamping information and information relating to the cables or buses traversing between the source and said one node, wherein the information relating to the cables or buses traversing between the source and said one node comprises a number of cables or buses traversing between the source and said one node such that a total transmission time is derived at said one node based on the number and the imposed transmission time.

15. The server cluster according to claim 14, wherein each node further comprises:
a chassis included in a computer rack that is included in a row of computer racks, the server cluster comprising a plurality of rows of computer racks, wherein the clock interconnection network comprises a plurality of cables or buses interconnecting the rows together, the plurality of cables or buses including cables or buses for interconnecting together computer racks in the same row, cables or buses for interconnecting together chassis in the same computer rack, and cables or buses for interconnecting together nodes in the same chassis, and
wherein the transmission of time-stamping information is further configured to transmit to each node in the server cluster having the time-stamping information, at least one item of information relating to a number of cables or buses for interconnecting rows traversed between the source and the node, a number of computer rack interconnection cables or buses traversed between the source and the node, and a number of chassis interconnection cables or buses traversed between the source and the node.

16. The server cluster according to claim 15, wherein the information relating to the cables or buses traversing between the source and said one node comprises:
at least one field indicating a number of cables or buses interconnecting rows traversing between the source and this node,
a field indicating a number of cables or buses interconnecting computer racks traversing between the source and the node and
a field indicating a number of cables or buses interconnecting chassis traversing between the source and this node, and
wherein, each of these fields is incremented as a corresponding cable or bus is traversed by a message that includes the time-stamping information intended for the node.

17. The server cluster according to claim 14, further comprising:
a first general administration network interconnecting all of the nodes together; and
at least a second network managing computing data exchanged between the nodes, interconnecting at least some of the nodes together, wherein said clock interconnection network is a supplementary network, distinct from the first general administration network and the computing data management network.

18. The server cluster according to claim 14, wherein the clock interconnection network is a network implementing the High-Level Data Link Control (HDLC) protocol.

19. A method for synchronizing a server cluster comprising a plurality of nodes each provided with an internal clock and interconnected with each other by a clock interconnection network, said clock interconnection network comprising a plurality of cables or buses connecting the plurality of nodes together, wherein each cable or bus of said plurality of cables or buses forms part of a transmission segment, the method comprising:
generating time-stamping information by the internal clock of a source chosen from the plurality of nodes in the server cluster;
transmitting, by the cables or buses of the clock interconnection network, said time-stamping information to the plurality of nodes in the server cluster from the source;
imposing, via at least one delay locked loop (DLL) of each of the transmission segments, on the transmission segment a predetermined, constant transmission time of the time-stamping information through the cable or bus, wherein the imposed transmission time is a same, maximum value for the each transmission segment, the imposed transmission time being established for all of the cables or buses; and
responsive to receiving the time-stamping information by any one of the plurality of nodes in the server cluster, adjusting the internal clock of said one node based on both the time-stamping information and information relating to the cables or buses traversing between the source and said one node, wherein the information relating to the cables or buses traversing between the source and said one node comprises a number of cables or buses traversing between the source and said one node such that a total transmission time is derived at said one node based on the number and the imposed transmission time.

* * * * *